(12) United States Patent
Fletcher et al.

(10) Patent No.: US 9,546,570 B2
(45) Date of Patent: Jan. 17, 2017

(54) BEARING ARRANGEMENT

(71) Applicant: ROLLS-ROYCE PLC, London (GB)

(72) Inventors: Paul Fletcher, Rugby (GB); John Richard Webster, Derby (GB); Alan Robert Maguire, Derby (GB)

(73) Assignee: ROLLS-ROYCE plc, London (GB)

( * ) Notice: Subject to any disclaimer, the term of this patent is extended or adjusted under 35 U.S.C. 154(b) by 429 days.

(21) Appl. No.: 14/290,512

(22) Filed: May 29, 2014

(65) Prior Publication Data
US 2014/0369830 A1    Dec. 18, 2014

(30) Foreign Application Priority Data

Jun. 18, 2013 (GB) .................................. 1310834.5

(51) Int. Cl.
*F16C 27/04* (2006.01)
*F01D 25/16* (2006.01)
(Continued)

(52) U.S. Cl.
CPC ............ *F01D 25/16* (2013.01); *F01D 25/162* (2013.01); *F02C 7/28* (2013.01); *F16C 19/10* (2013.01);
(Continued)

(58) Field of Classification Search
CPC .......... F16C 19/10; F16C 19/12; F16C 19/18; F16C 19/181; F16C 19/54; F16C 19/541; F16C 19/542; F16C 27/04; F16C 27/08; F16C 35/077; F16C 37/007; F16C 41/02; F16C 2202/08; F16C 2202/42; F16C 2202/22; F16C 40/12; F16C 2360/23; F01D 25/164
See application file for complete search history.

(56) References Cited

U.S. PATENT DOCUMENTS 4,547,083 A * 10/1985 Horler .................. F01D 25/164
                                                      384/535
5,316,393 A *  5/1994 Daugherty ............ F16C 25/083
                                                      384/517
(Continued)

FOREIGN PATENT DOCUMENTS

EP          2 083 150 A1    7/2009
EP          2 339 131 A1    6/2011
(Continued)

OTHER PUBLICATIONS

Nov. 25, 2014 Search Report issued in EP Application No. 14170457.
British Search Report issued in British Application No. GB1310834.5 issued Dec. 9, 2013.

*Primary Examiner* — Phillip A Johnson
(74) *Attorney, Agent, or Firm* — Oliff PLC

(57) ABSTRACT

A bearing arrangement is disclosed. The bearing arrangement includes first and second bearings, with each bearing including a respective support element and a respective set of rolling elements and defining a respective load path extending through the respective support element and rolling elements. The support elements are coupled such that a load applied to either support element is transmitted through both the first and second load paths. The arrangement further includes a pair of superelastic titanium alloy elements located in the respective load paths to provide resilient movement between the bearings when a load is applied to the bearing arrangement.

16 Claims, 6 Drawing Sheets

(51) Int. Cl.
*F16C 35/077* (2006.01)
*F16C 41/02* (2006.01)
*F16C 41/00* (2006.01)
*F02C 7/28* (2006.01)
*F16C 19/54* (2006.01)
*F16C 19/10* (2006.01)
*F16C 27/08* (2006.01)
*F16C 37/00* (2006.01)
*F16C 25/08* (2006.01)

(52) U.S. Cl.
CPC ............. *F16C 19/54* (2013.01); *F16C 35/077* (2013.01); *F16C 41/004* (2013.01); *F16C 41/02* (2013.01); *F05D 2300/174* (2013.01); *F05D 2300/501* (2013.01); *F16C 25/083* (2013.01); *F16C 27/08* (2013.01); *F16C 37/007* (2013.01); *F16C 2202/08* (2013.01); *F16C 2204/42* (2013.01); *F16C 2360/23* (2013.01)

(56) References Cited

U.S. PATENT DOCUMENTS

| | | |
|---|---|---|
| 6,109,022 A | 8/2000 | Allen et al. |
| 8,083,472 B2 | 12/2011 | Maguire |
| 8,636,413 B2 * | 1/2014 | Fiedler .................. F01D 25/164 |
| | | 384/535 |
| 2012/0144939 A1 * | 6/2012 | Kullin .................. H01J 35/101 |
| | | 74/25 |
| 2013/0108440 A1 | 5/2013 | Do et al. |

FOREIGN PATENT DOCUMENTS

| | | | |
|---|---|---|---|
| FR | 2 938 874 A1 | 5/2010 | |
| GB | 2 322 914 A | 9/1998 | |
| GB | 2 444 935 A | 6/2008 | |
| SE | EP 2535607 A1 * | 12/2012 | ........... F01D 25/164 |
| WO | 2008/106952 A1 | 9/2008 | |

* cited by examiner

BEARING ARRANGEMENT

FIELD OF THE INVENTION

The present invention relates to a bearing arrangement and a gas turbine engine comprising a bearing arrangement.

BACKGROUND OF THE INVENTION

Rotating shafts such as those used in gas turbine engines require bearings to react radial and thrust loads in relatively moving or rotating components.

Where light weight and minimum power loss from friction are required, rolling element bearings are common, and may be used to react both radial and thrust loads. Examples of rolling element bearings include ball bearings and roller bearings.

In some applications, where space is limited, multiple thrust bearing rows can be stacked to share the thrust load, as shown in FIG. 1.

Referring to FIG. 1, a prior thrust bearing assembly 1 comprises a pair of inner bearing races 2, 4 which each engage against a first side of respective first and second sets of rolling elements 3, 5. The assembly 1 also comprises an outer bearing race 6 which engages against a second side of the first and rolling elements 3, 5. The inner bearing races 2, 4 are coupled to a first shaft 7, and the outer bearing race 6 is coupled to a second shaft 8, or a stationary component. The bearing assembly 1 thereby rotatably couples the first and second shafts 7, 8 together. In use, a load is applied in an axial direction X to the outer bearing race 6 by the shaft 8, and is transferred to the inner bearing races 2, 4 via the rolling elements 3, 5. The first, and second inner bearing races 2, 4 define a pair of load paths 9a, 9b extending between the first and second shafts 7, 8 through respective bearing races 2, 4. The load is thereby shared between the first and second bearing races 2, 4. Such an assembly is known as a "stacked bearing". Further bearing sets and bearing races can be added to either end, such that the load can be shared by three or more bearing sets. Such an arrangement may be capable of reacting relatively large loads, while having a relatively small radial width.

One problem with prior bearing assemblies such as the stacked bearing assembly described above, is that the geometry of the rolling elements and bearing races must be carefully controlled such that the load is shared relatively equally between the pairs of races and rolling elements. Small variations (such as of the order of a few microns in some cases) in the geometry of the rolling elements or bearing races can lead to one component taking more of the load relative to the other. Furthermore, the materials of the rolling elements or bearing races may expand in use due to heating, which further exacerbates the geometrical variations, leading to a "runaway" effect, in which one component takes progressively more of the load, which may eventually lead to bearing failure. On the other hand, underloading of one set of rolling elements may result in "skidding" of that set, which may result in damage, debris release and bearing failure. Such bearings are also relatively difficult to supply with lubricating or cooling fluids.

Stacked bearing arrangements including hydraulic or pneumatic pistons have been suggested to address the above issues, such as that described for example in U.S. Pat. No. 8,083,472. However, such arrangements are not sufficiently robust for use in high temperature, high vibration environments, or for use in safety critical applications, such as compressor and fan shafts for gas turbine engines.

Gas turbine engines employ at least one shaft for transferring mechanical power between a turbine and a compressor. FIG. 2 shows a turbofan engine 10 comprising an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. The engine 10 is supported by outlet guide vanes (OGVs) 39, which extend between the engine 10 and nacelle 30, and also serve to remove exit swirl from the fan 14.

The engine 10 further comprises a high pressure shaft 34 connecting the high pressure compressor 18 and high pressure turbine 20, an intermediate pressure shaft 36 connecting the intermediate pressure compressor 16 and intermediate pressure turbine 24, and a fan shaft 38 connecting the fan 14 and low pressure turbine 26. Each shaft 34, 36, 38 is mounted by one or more respective bearing assemblies 37, either to another shaft, or to a static structure of the engine 10. Each bearing assembly 37 must usually constrain both radial (i.e. vibration) and axial (i.e. thrust) loads.

In particular, where the fan 14 loses a fan blade (known in the art as a "blade off"), the fan shaft bearing 37 must constrain significant radial loads for a period of time as the engine 10 is shut down. In one prior arrangement, additional means are provided to allow the fan to rotate in an eccentric state without overloading the engine structure. Such means may include fusible elements that allow the fan to run on additional catcher bearings, or further articulation in the bearing supports provided by universal joints.

The present invention describes a bearing arrangement and a gas turbine engine comprising a bearing arrangement which seeks to overcome some or all of the above problems.

SUMMARY OF THE INVENTION

According to a first aspect of the present invention, there is provided a bearing assembly comprising:

a first support element and a first set of rolling elements, wherein a first load path extends through the first support element and the first set of rolling elements; and a second support element and a second set of rolling elements, wherein a second load path extends through the second support element and second set of rolling elements;

the arrangement comprising a coupling between the first support element and the second support element arranged to transmit a load applied to either support element through both the first and second load paths;

wherein the bearing arrangement further comprises a superelastic titanium alloy element located in each load path.

Advantageously, the use of a superelastic titanium alloy element in each of the load paths transmits the load evenly through the first and second load paths. The arrangement thereby provides a load balancing bearing arrangement which is relatively robust, simple, and is capable of reacting relatively large loads within a relatively small radial space. The arrangement is capable of sharing loads while permitting manufacturing methods having larger tolerances compared to prior arrangements, and is therefore relatively inexpensive to produce.

The superelastic titanium alloy may comprise a beta-titanium alloy that deforms by a superelastic transformation. The term "superelastic" may be taken to mean that the transformation is a reversible phase transformation that occurs under stress between a parent phase (e.g. body-centred cubic titanium) and a product phase (e.g. hexagonal alpha titanium, orthorhombic alpha double prime titanium or hexagonal omega titanium).

The first and second support elements may be spaced in an axial direction. The coupling may couple the first support element to a first side of the first set of rolling elements, and to a first side of the second set of rolling elements. The, second support element may be coupled to a second side of the first set of rolling elements, and to a second side of the second set of rolling elements. Accordingly, the bearing assembly provides generally parallel load paths in which the thrust load is balanced between the two load paths. Such an arrangement is relatively compact, while sharing the loads equally between two or more bearing sets and bearing races The assembly may comprise a first superelastic titanium alloy element located in the first load path between the first set of rolling elements and the first support element, and the assembly may comprise a second superelastic titanium alloy element located in the second load path between the second set of rolling elements and the second support element.

Alternatively, a single superelastic titanium alloy element may be located in both the first and second load paths.

The superelastic titanium alloy element may comprise parameters corresponding to a required relative movement between the first and second bearings under load, i.e. to a required strain. The parameters of the element may comprise one or more of the material thickness of the element in a direction extending along the load path, the contact area between the support element and the rolling element, and one or more material properties of the superelastic titanium alloy element.

In general, the modulus of elasticity of the superelastic titanium alloy element is substantially constant when a load within a predetermined range is applied to the element. The superelastic titanium element may have an elastic modulus less than 80 Gpa, and may have an elastic modulus less than 60 GPa, and may have an elastic modulus between 20 and 60 GPa when a load within the predetermined range is applied. The stiffness of the superelastic titanium element when a load within the predetermined range is applied has been found to be directly proportional to the contact area between the bearing and the element. The stiffness of the superelastic titanium element has been found to be inversely proportional to the material thickness of the element when a load within the predetermined range is applied. The predetermined load may be between 5,000 and 30,000 pounds force (lbf).

The bearing assembly may comprise a container at least partly surrounding the or each superelastic titanium element, such that expansion of the element normal to the load direction is constrained in use.

The or each superelastic titanium alloy element may be attached to a support element along an attachment axis extending generally parallel to the load axis, such that relative movement between the first and second bearings imparts a shear force to the superelastic titanium element. Advantageously, by arranging the assembly such that a shear force is applied to the superelastic titanium element, it has been found that greater damping is provided by the superelastic titanium element, compared to when the assembly is arranged such that a compressive or tensile force is applied to the superelastic titanium element. Consequently, such an arrangement can reduce vibration of the shaft and/or bearing in use, particularly along the axial direction.

The or each superelastic titanium alloy element may be in thermal contact with at least one of the rolling elements. The arrangement may further comprise a coolant passage defined in part by the or each superelastic titanium alloy element and at least one rolling element, such that in use, coolant flowing through the coolant passage transfers heat between at least one of the rolling elements and the superelastic titanium alloy element. Advantageously, where one or more of the rolling elements overheats, at least some of the heat is transferred to the superelastic titanium alloy elements by the coolant. The superelastic titanium alloy elements will be caused to thermally expand, thereby increasing the amount of deformation of the titanium elements when a load is applied to the bearing arrangement. Consequently, the arrangement is less prone to thermal runaway of the bearings compared to prior arrangements.

According to a second aspect of the present invention there is provided a gas turbine engine comprising a bearing arrangement in accordance with the first aspect of the invention.

The bearing arrangement may be arranged to rotatably support a fan shaft of the gas turbine engine. The support element may be coupled to the fan shaft by a frangible coupling, the assembly being arranged such that the first support element is decoupled from the fan shaft when the fan shaft is subjected to a predetermined load, and may be arranged such that the first support element is decoupled from the fan shaft when the fan shaft is subjected to a predetermined radial load. A superelastic titanium alloy element may be located in the second load path such that the second support element provides pivoting movement about an axis normal to the axis of the fan shaft when the first support element is decoupled from the fan shaft.

Advantageously, where the bearing arrangement is used to rotatably support a fan shaft of a gas turbine engine, the superelastic element can provide pivoting movement of the fan shaft where the fan is out of balance. Further support such as catcher bearings are therefore not required, thereby reducing parts count and overall weight of the engine.

DETAILED DESCRIPTION

Figure 1:
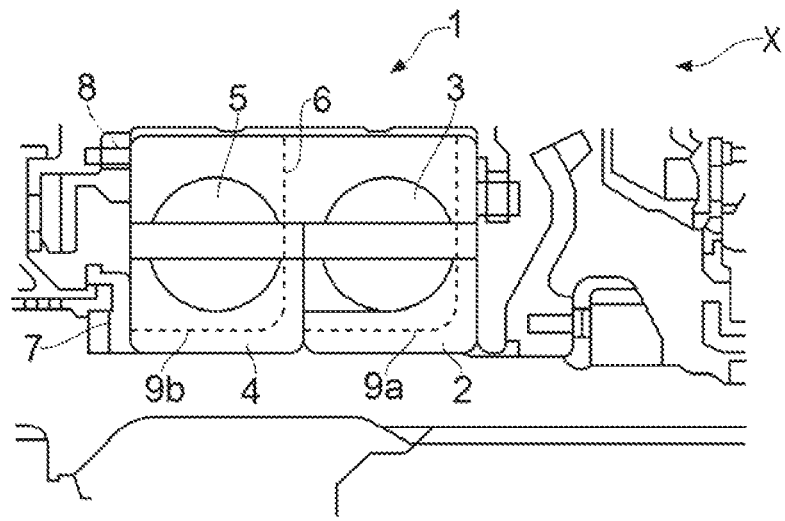
FIG. 1 shows a cross sectional view of a prior bearing assembly.
Figure 2:
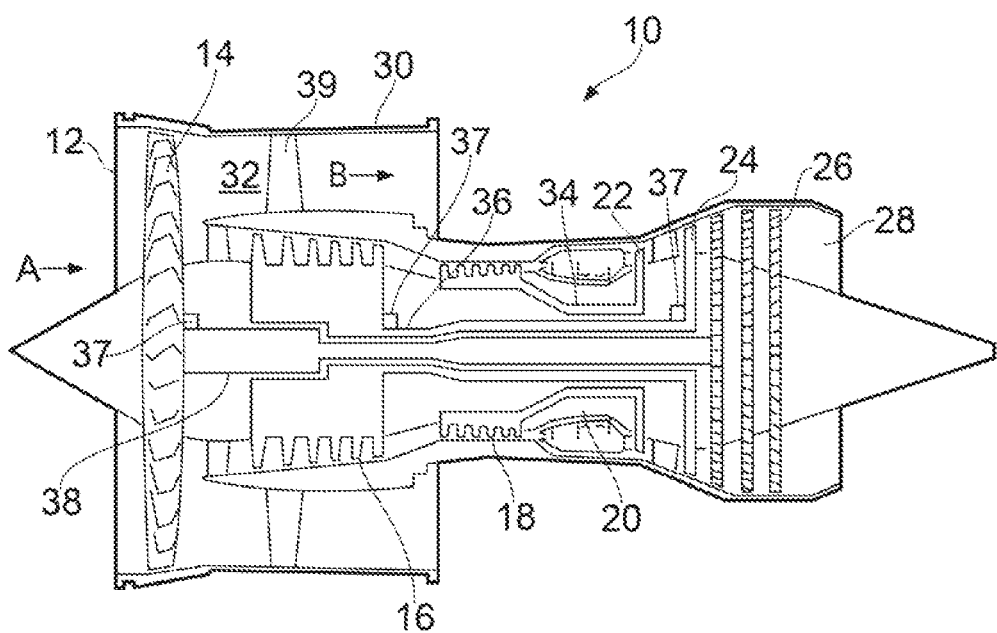
FIG. 2 shows a cross sectional view of a gas turbine engine.
Figure 3:
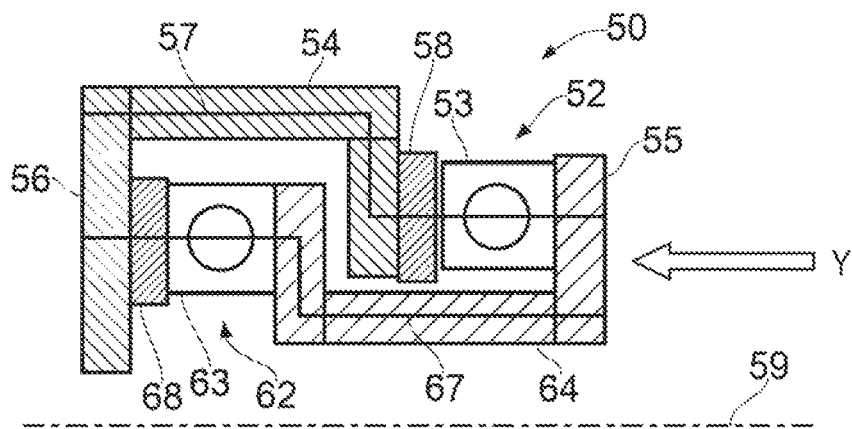
FIG. 3 shows a cross sectional view of a first bearing assembly.

FIG. 3 shows a cross section through part of a first bearing assembly 56. The bearing assembly 50 comprises first and second bearings 52, 62. Each bearing 52, 62 comprises a respective bearing set 53, 63 comprising a plurality of rolling elements such as rollers or ball bearings 56, 66. In a typical application in a large civil gas turbofan, the ball bearings 56, 66 may have a diameter of between 10 and 25 mm, and may be configured to accommodate an axial load in the direction Y in the region of between 5,000 and 30,000 pounds force (lbf), or even more in some cases. Each bearing 52, 62 further comprises respective first and second bearing support elements in the form of races 54, 64 which engage against the respective bearing sets 53, 63 to allow rolling movement therebetween.

The first and second bearings 52, 62 are coupled at either end by couplings in the form of a shaft 55 and a stationary component 56, such that a load applied to the shaft 55 or stationary component 56 is transmitted through both bearings 52. 62 along generally parallel load paths 57, 67 which each extend from the shaft 55 to the stationary component 56. The shaft 55 rotates about an axis 59.

Each bearing 52, 62 further comprises a respective superelastic titanium alloy element 58, 68 located in each load path 57, 67. In the embodiment shown in FIG. 3, each superelastic element 58, 68 is located adjacent between a respective rolling element set 53. 63 and the respective support element 54, 64. However, in general, the superelastic titanium alloy elements can be located in any location between the shaft 55 and stationary component 56, provided the elements 58, 68 are located in the respective load paths 57, 67.

The superelastic titanium alloy elements 58, 68 each comprise a titanium alloy that deforms by superelastic transformation. The elements 58, 68 have a low elastic modulus (i.e. Young's modulus), and preferably also a low shear modulus. A superelastic transformation is a substantially reversible phase transformation that occurs under stress between a parent phase (e.g. body-centred cubic titanium) and a product phase (e.g. hexagonal alpha titanium, orthorhombic alpha double prime titanium or hexagonal omega titanium). In one example, where the bearing is to be installed as part of a gas turbine engine, a superelastic titanium alloy is chosen having a low modulus at temperatures up to 300° C.

A first known titanium superelastic alloy is "gum metal", also known as TNTZ. TNTZ has a nominal composition comprising, in weight percent, 23% niobium, 0.7% tantalum, 2% zirconium, and 1% oxygen, with the balance being titanium. TNTZ can exhibit superelastic properties over a range of compositions and also include vanadium and hafnium. Such alloys may be relatively strong, with an ultimate tensile strength of around 2 GPa. The Young's modulus of gum metal can range from 20 to 60 GPa. The Shear modulus also varies, and may be as low as 20 GPa.

A second superelastic titanium alloy comprises, in weight percent, approximately 24% niobium, 4% zirconium and 8% tin, with the balance being titanium. This alloy is a β type titanium alloy, having a body centred cubic crystal structure. Nanostructured alloy having a grain size less than 50 nm has been produced by cold rolling, and has been found to be particularly suitable, having an ultimate tensile strength of approximately 500 to 100 MPa.

A fourth known superelastic titanium alloy comprises, in weight percent, 28% niobium, 1% iron and 0.5% silicon, with the balance being titanium.

Figure 12:
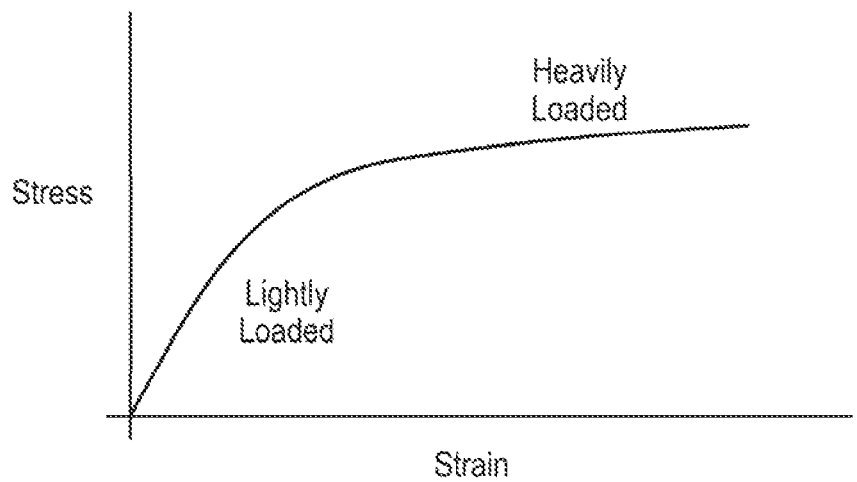
FIG. 12 show the relationship between stress and strain of a superelastic titanium alloy.

Referring to FIG. 12, gum metal has been found to have a non-linear stress stain curve, having a relatively low Young's modulus (i.e. a low ratio of stress to strain when a load is applied) in a heavily loaded condition. Consequently, the superelastic titanium elements 58, 68 compress to a relatively large extent when a compressive force is applied, and will also shear to a relative large extent when a shear force is applied. The superelastic titanium alloy elements 58, 68 may be treated prior to assembly to obtain a required stiffness, i.e. a required modulus depending on the maximum load to which the assembly 10 is to be subjected in use. Where the superelastic element comprises gum metal, the treatment may comprise cold working. It has been found that cold working of gum metal can be used to decrease the Young's and shear modulus of gum metal, and increase the yield strength. In addition, the gum metal may be heat treated, which may increase the Young's modulus somewhat, while significantly increasing the yield strength. Subsequent to treatment, the superelastic titanium alloy elements 58, 68 may have a Young's modulus below 80 GPa, and preferably have a Young's modulus below 60 GPa. In one example, the Young's modulus is approximately 65 GPa, and the Poisson's ratio (i.e. the negative ratio of transverse to axial strain) of the superelastic element is approximately 0.28. The elements 58, 68 may be capable of relatively large strains, up to 2% in some cases, and stresses of around 125 MPa without exceeding the elastic deformation limit. The element 58, 68 may have a coefficient of thermal expansion of approximately $0.7 \times 10^{-6}$ mm/mm/° C. at 100° C., $1.0 \times 10^{-6}$ mm/mm/° C. at 200° C.

In use, when a load is applied to the shaft 55 and stationary component 56, the superelastic titanium alloy elements 58, 68 are resiliently compressed in a direction parallel to the direction of the applied load (i.e. the direction Y shown in FIG. 3). Due to the low modulus of elasticity of the superelastic titanium alloy 58, 68, the compression of the elements permits significant movement between the first and second bearings 52, 62, which can thereby accommodate some variations in length, modulus, stiffness or elasticity between the components of the first and second bearings 52, 62 due to manufacturing defects or differential thermal expansion. Consequently, a load in the direction Y applied to the shaft 55 relative to the stationary component 56 is distributed substantially equally between the load paths 57, 67.

Some superelastic titanium alloys, such as gum metal and TNTZ have been found to have a non-linear stress/strain curve. FIG. 12 shows the stress/strain curve for TNTZ. As can be seen, the stress/strain curve has two distinct regions. In the first region, where the superelastic titanium alloy element 58, 68 is under relatively lightly loaded conditions, the superelastic titanium alloy has a higher Young's modulus than in the second region, where the alloy is under heavily loaded conditions. Consequently, heavily loaded regions of the superelastic titanium alloy elements 58, 68 (or different elements 58, 68) will deform to a relatively large extent relative to the load (i.e. experience relatively large strains) compared to lightly loaded regions. As a result, the superelastic titanium alloy elements 58, 68 will share loads between lightly loaded and heavily loaded regions very effectively.

As well as providing resilient movement between the bearings 52, 62, the superelastic titanium alloy elements 58, 68 can also dampen vibration in either or both of the axial or radial directions. It has been found that maximum damping is provided when the material is loaded to a relatively high strain, and in shear. Consequently, the assembly is arranged such that the load paths 57, 67 are conical, or approximately conical. For example, as shown in FIG. 3, the load paths 57, 67 extend in a direction parallel to the axial direction Y for part of the distance between the shaft 55 and the stationary component 56, and in a direction perpendicular to the axial direction, or at an angle between perpendicular and parallel to the axial direction. Consequently, when a load is applied to the load path in the axial direction Y, the load applied to the superelastic titanium element in each load path experiences has both an axial and a radial component. As a result, a shear force is applied to the superelastic titanium element. It has been found that the superelastic titanium element provides greater vibrational damping when a shear load is applied thereto—consequently, this arrangement provides improved damping compared to where the assembly is arranged such that only a compressive or tensile force is applied to the superelastic titanium element.

Figure 4:
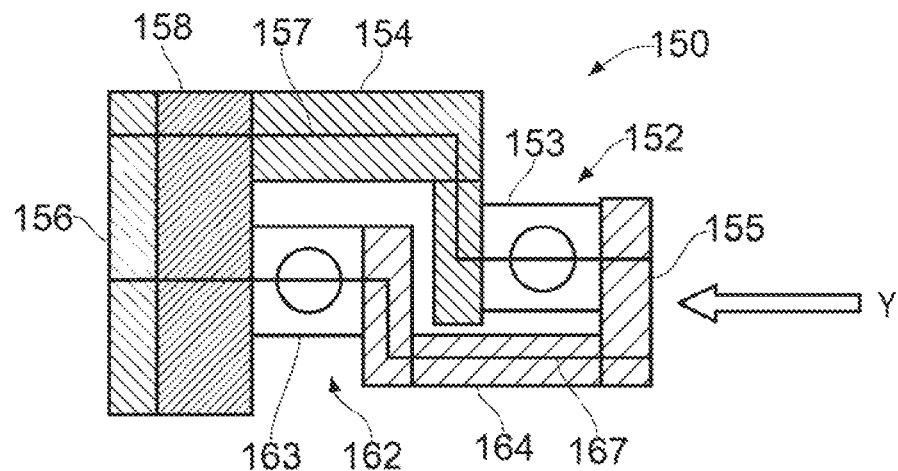
FIG. 4 shows a cross sectional view of a second bearing assembly.

FIG. 4 shows a second bearing assembly 150. The assembly 150 is similar to the assembly 50, having a first shaft 155 and stationary component 156, and first and second bearings 152. 162, each bearing comprising a respective bearing set 153, 163 comprising a plurality of rolling elements, and bearing race 154, 164. Each bearing 152, 162 defines a respective load path 157, 167. The bearings 152, 162 are coupled to one another at either end by the shaft 155 and stationary component 156. However, the second assembly 150 comprises a single superelastic titanium alloy element 158. The element 158 is located between the stationary component 156 and both the first and second bearings 152, 162. Due to the superelastic of the element 158, a load Y applied to the shaft 155 or stationary 156 will cause a load to be transmitted via both load paths 157, 167 to the other of the stationary component 156 and shaft 155. If one of the load paths 156, 157 is subjected to a higher load than the other (such as due to manufacturing tolerances between the bearings 152, 162 or thermal expansion for example), the element 158 will be caused to resiliently deform, i.e. to be compressed to a greater extent at the contact area between the element 158 and bearing 152, 162 which transmits the greater load, and to a lesser extent at the contact area between the element 158 and bearing 152, 162 which transmits the lesser load. Consequently, the deformation of the element 158 allows relative movement between the first and second bearings 152, 162, which in turn reduces the relative difference in load transmitted by the first and second load paths 157, 167, thereby balancing the load. As a further advantage, the deformation of the element 158 prevents excessive loads being applied through either load path, which might otherwise be the case due to geometric tolerances.

Figure 5:
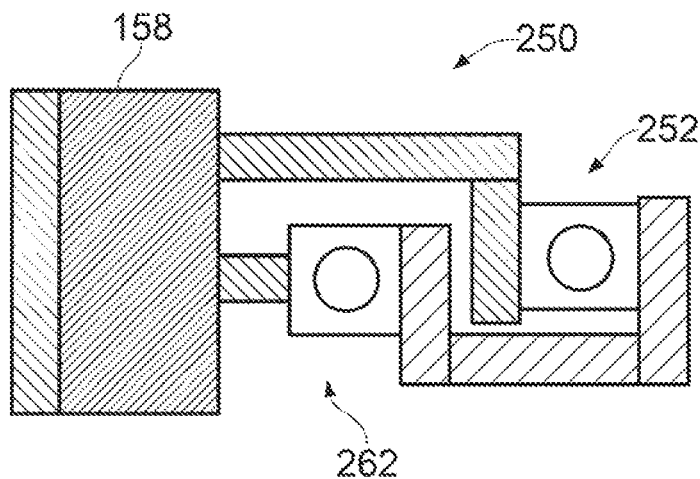
FIG. 5 shows a cross sectional view of a third bearing assembly.

FIG. 5 shows a third bearing assembly 250 comprising first and second bearings 252, 262 and a superelastic element 158. The assembly 250 is similar to the assembly 150, except that the superelastic element 258 has a greater thickness in a direction parallel to the load paths 156, 157 compared to the element 158. The greater thickness provides a greater strain (i.e. a greater amount of compressive movement when a given pressure is applied to the element 258). Consequently, the thicker superelastic element 258 permits greater relative movement between the first and second bearings 252, 262. By varying both the thickness and the metallurgical properties of the superelastic elements, the assembly 250 can be configured to support a required range of loads, and accommodate a required range of manufacturing tolerances.

Figure 6:
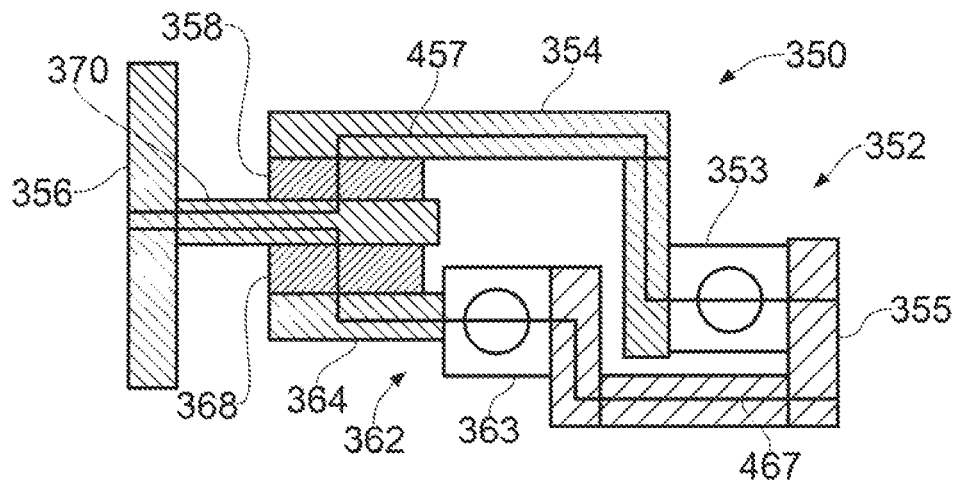
FIG. 6 shows a cross sectional view of a fourth bearing assembly

FIG. 6 shows a fourth bearing assembly 350 comprising first and second bearings 352, 362, each comprising respective bearing sets 353, 363, bearing races 354, 364 and superelastic elements 358, 368. The fourth bearing further comprises a first shaft 355, and a stationary component 356, which couple the first and second bearings 352, 362 at respective ends.

The second shaft 356 comprises a projection 370 which overlaps between ends of the bearing races 354, 364 of the first and second bearings 352, 362. The superelastic elements 358, 368 are located between and are attached to each of the bearings races 354, 364 and the projection 370 such that the elements 358, 368 are not able to slide in the axial direction Y. In use, a load applied to the shaft 355 and stationary component 356 in the axial direction Y results in movement between the first and second bearings 352, 362 and the projection 370, which in turn imparts a shear force to the elements 358, 368. Due to the low shear modulus of the elements 358, 368, the shear force causes the elements 358, 368 to resiliently deform, thereby permitting movement between the first and second bearings 352, 362. Again therefore, the bearing assembly 350 can distribute loads between the first and second bearings 352, 362 in spite of manufacturing tolerances. Again, the superelastic elements may be subjected to cold working and/or heat treatment to obtain the required metallurgical properties (such as strength and Young's/shear modulus) to support a required axial load, and to provide the required tolerance margin. Such an arrangement is relatively compact, and is particularly suitable for concentric shafts, such as within a gas turbine engine.

Figure 7:
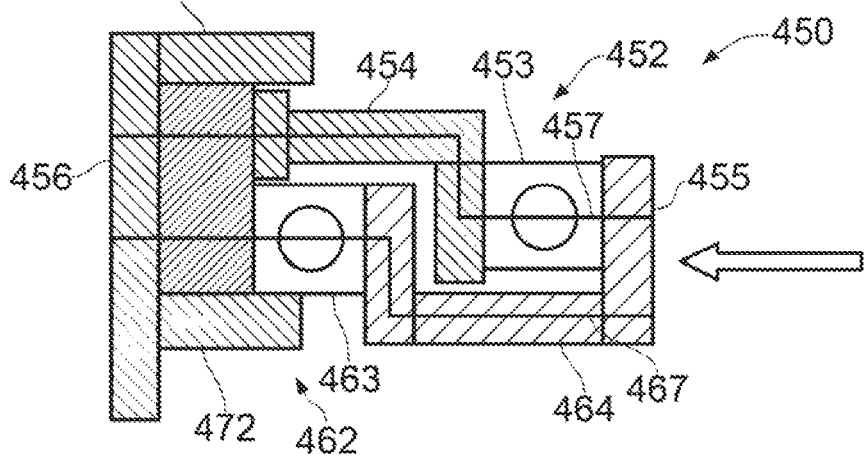
FIG. 7 shows a cross sectional view of a fifth bearing assembly.

FIG. 7 shows a fifth bearing assembly 450. The assembly 450 is similar to the third assemblies 250, and comprises a shaft 455, a stationary component 456 and first and second bearings 452, 462, each bearing comprising a respective bearing set 453, 463 and bearing race 454, 464. Each bearing 452, 462 defines a respective load path 457, 467, with a superelastic titanium alloy element 458 being located in both load paths 457, 467, between the stationary component 456 and the first and second bearings 452, 462.

The second shaft 456 comprises a container, having radially inner and outer side walls 472. The side walls 472 constrain the superelastic element 458 such that any increase in radial extent (i.e. in a direction normal to the longitudinal, axis Y) due to compression of the superelastic element 458 is prevented. Consequently, the superelastic element 458 will act as a "hydrostatic" coupling. Consequently, any load applied through one load path 457, 467 will be transmitted to the other load path 457, 467 through the superelastic element 458, thereby sharing the load between the bearings 452, 462.

Figure 8:
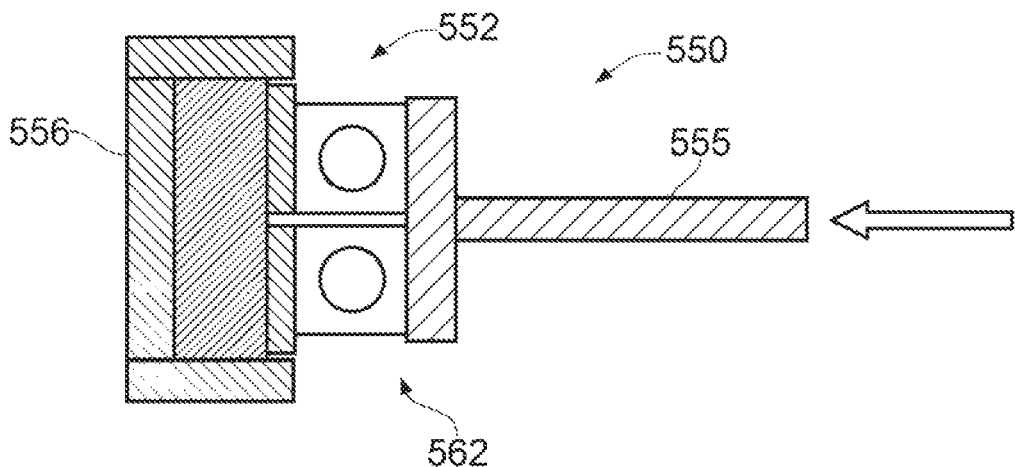
FIG. 8 shows a cross sectional view of sixth bearing assembly.

FIG. 8 shows a sixth bearing assembly 550, which is similar to the assembly 450. The assembly 550 comprises first and second bearings 552, 562 which are positioned in parallel, with the first bearing 552 located radially inwardly of the second bearing 562. Such an arrangement has a greater radial extent compared to the previously described arrangements, but has a shorter axial extent. The assembly 550 is coupled at either end by a shaft 555 and a stationary component 556.

Figure 9:
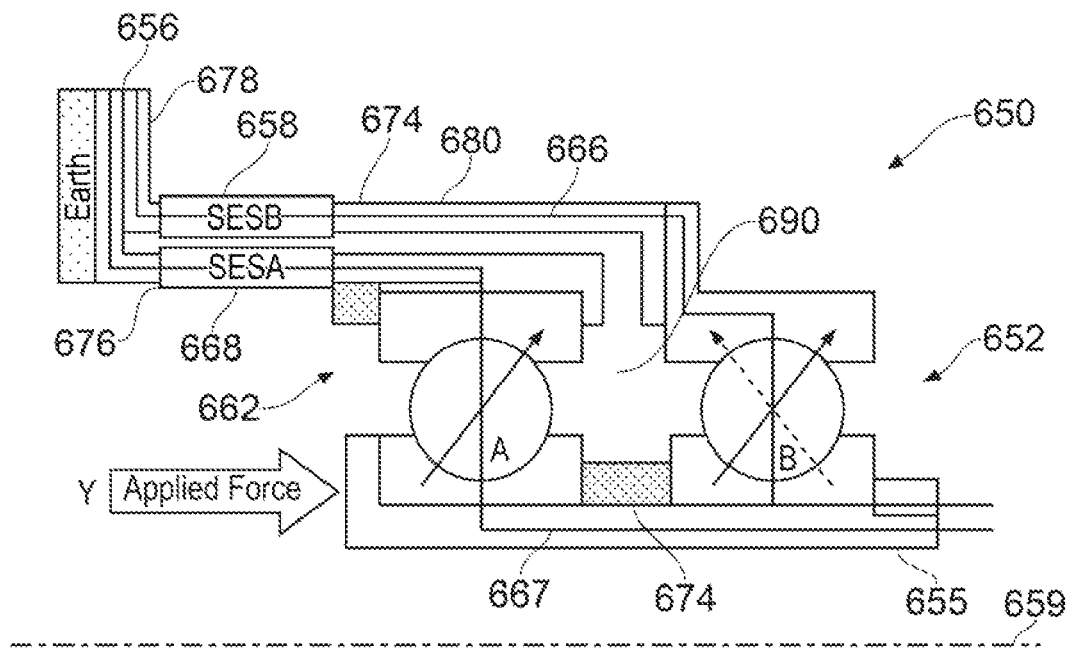
FIG. 9 shows a cross sectional view of a seventh bearing assembly.

FIG. 9 shows a seventh bearing assembly 650. The assembly 650 comprises a shaft 655, connected by first and second bearings 652, 662 to a stationary component 656, within which the shaft 655 rotates. The first and second bearings 652, 662 are located between the shaft 655 and stationary component 656 and are spaced axially, a spacer 674 being located axially between the first and second bearings 652, 662. First and second load paths 666, 667 extend between the shaft 655 and stationary component 656 via the first and second bearings 652, 662.

The stationary component 656 comprises first and second contact arms 674, 676, which engage with respective bearings 652, 662 at one end, and are coupled together at the other end. Each contact arm 674, 676 comprises a first portion 678 which extends in a direction generally normal to the axis 659, and a second portion 680 which extends parallel to the axis 659, and is radially spaced from the other contact arm. Each contact arm 674, 676 comprises a respective superelastic element 658, 668.

The assembly 650 has a "preload", such that when no axial load is applied to the shaft 655, the superelastic elements 658, 668 are held in compression. When an axial load greater than the preload is applied to the shaft 655 in the direction Y, a tensile load is transmitted to the stationary component 666 along the load paths 657, 667 via the respective bearings 652, 662, contact arms 674, 676 and superelastic elements 658, 668. The load causes the superelastic elements 658, 668 to deform away from the axial direction (i.e. to bend), and also to elongate in the axial direction to different extents depending on the load transmitted through the respective load path 666, 667. The superelastic elements 658, 668 are therefore subject to torsional and tensile forces when a load is applied. Consequently, where tolerances result in a greater load being transmitted to one of the bearings relative to the other, the superelastic elements 658, 668 compensate, thereby distributing the load between the bearing elements. A load applied to one of the shafts 655, 656 in a radial direction (i.e. normal to the axis 659), will also result in bending (i.e. torsional loading) of the superelastic elements 658, 668, thereby causing a reaction force in the opposite direction. The assembly 650 is therefore capable of reacting both axial and radial loads, with the load being shared between the first and second bearings 652, 662. The superelastic elements 658, 668 ensure that the load is shared evenly between the bearings 652, 662, while also providing some degree of damping of axial and radial movement. Instead of a shaft and a stationary component, the assembly 650 would also be suitable for rotatably coupling concentric shafts, such as the low pressure and intermediate pressure shafts of a gas turbine engine.

The bearings 652, 662 define an annular passage 690 through which a coolant such as mineral oil passes in use. The coolant both lubricates and cools the bearings 652, 662. The annular passage 690 is also defined in part by the superelastic elements 658, 668, such that the coolant flows past the elements 658, 668 in use, thereby transferring heat from the bearings 652, 658 to the coolant, and then to the superelastic elements 658, 668.

Consequently, where the assembly 650 is subjected to relatively high temperatures, such as may be generated by the bearings 652, 662 for example, the superelastic elements 658, 668 are heated, thereby increasing in length, particularly in the axial direction. Consequently, the superelastic elements 658, 668 deform to a greater extent for a given load, thereby reducing the load on the bearings 652, 658. Consequently, the bearings generate less heat. As a result, the arrangement of the assembly 650 reduces thermal runaway by lengthening the respective load paths.

Furthermore, the bending movement of the elements 658, 668 has been found to permit relatively large movement between the bearings 652.658 compared to arrangements in which the elements are loaded only in tension, compression or shear. Consequently, the arrangement of FIG. 9 is capable of accommodating relatively large tolerances, while evenly sharing the loads between bearings 652, 658.

Figure 10:
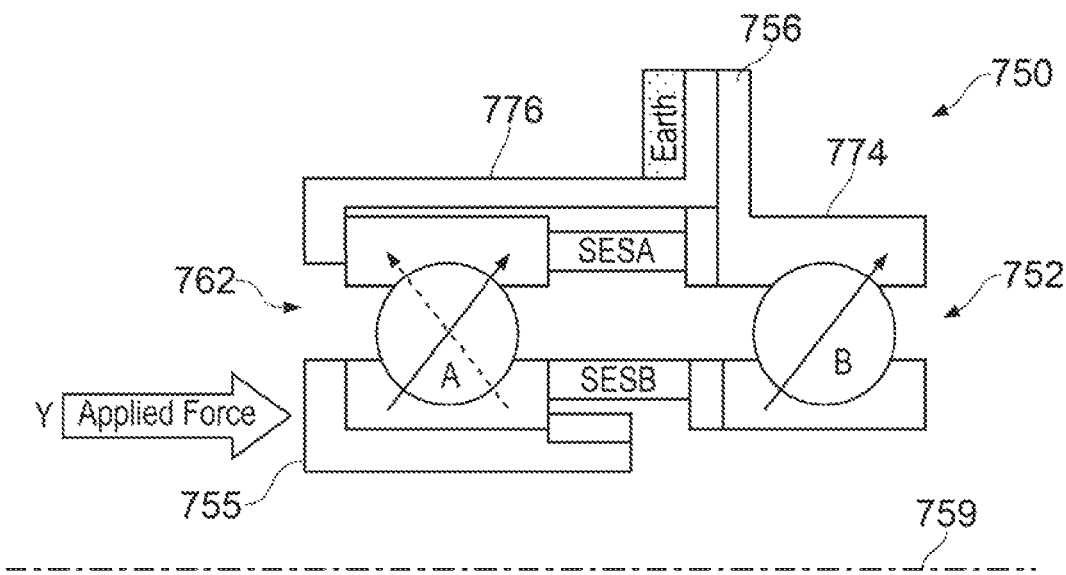
FIG. 10 shows a cross sectional view of a eighth bearing assembly.

FIG. 10 shows an eighth bearing assembly 750. The bearing assembly 750 comprises first and second bearings 752, 762, which are again separated axially along an axis 759. The first and second bearings 752, 762 rotatably support a shaft 755 relative to a stationary component 756. The second bearing 762 is directly coupled to the shaft 755 and stationary component 756, while the first bearing 752 is directly coupled only to the stationary component 756. The stationary component 756 comprises a pair of contact arms 774, 776, which couple respective bearings 752, 762 to the second shaft 756. The first and second bearings 752, 762 are coupled together by radially spaced first and second superelastic titanium elements 758, 768. First and second load paths 757, 767 extend through the shaft 755 to the stationary component 756 through respective bearings 752, 762, superelastic elements 758, 768 and contact arms 774, 776.

In the assembly 750, an axial load Y applied to the shaft 755 results in a compressive load which passes through both of the superelastic elements 758, 768, which results in deformation of the elements 758, 768. Consequently, the load is shared between the first and second superelastic elements.

Again, the first and second bearings 752, 762 and superelastic elements 758, 768 define an annular lubricant passage 790. Lubricant flowing through the lubricant passage in use thereby contacts the bearings and elements, thereby transferring heat generated by the bearings 752, 762 to the superelastic elements 758, 768. The resulting heating of the superelastic elements 758, 768 in use results in thermal expansion of the superelastic elements 758, 768, which in turn results in greater deformation for a given load. Again therefore, the assembly 750 is less prone to thermal runaway compared to prior arrangements.

Figure 11A:
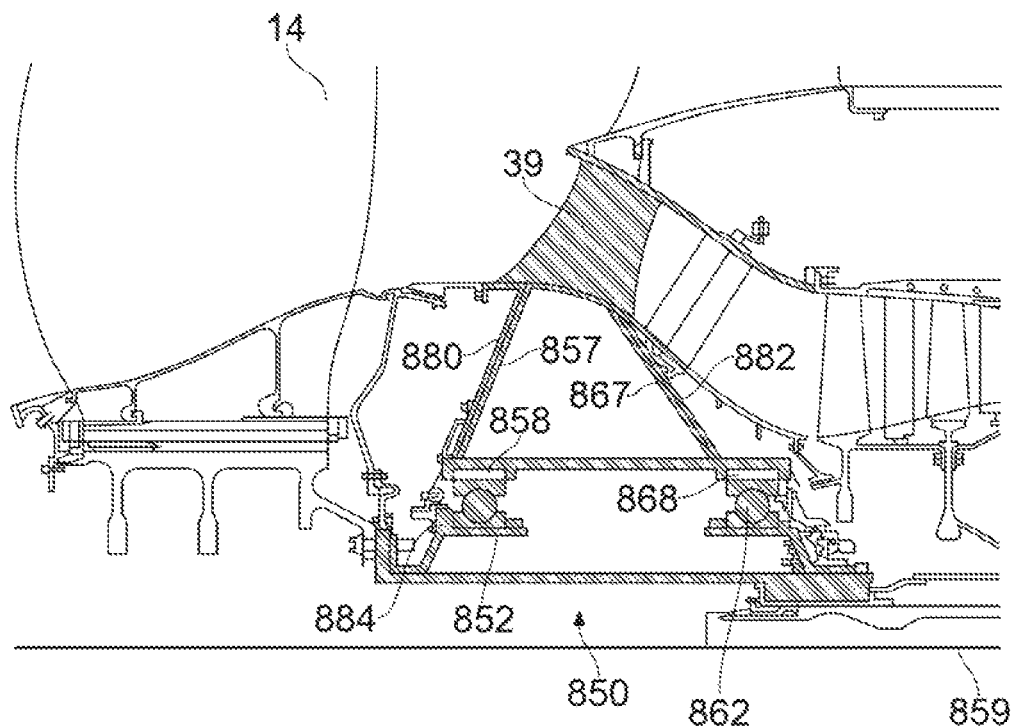
FIGS. 11*a* and 11*b* show cross sectional views of a gas turbine engine comprising a ninth bearing assembly in nominal and off-nominal conditions respectively.
Figure 11B:
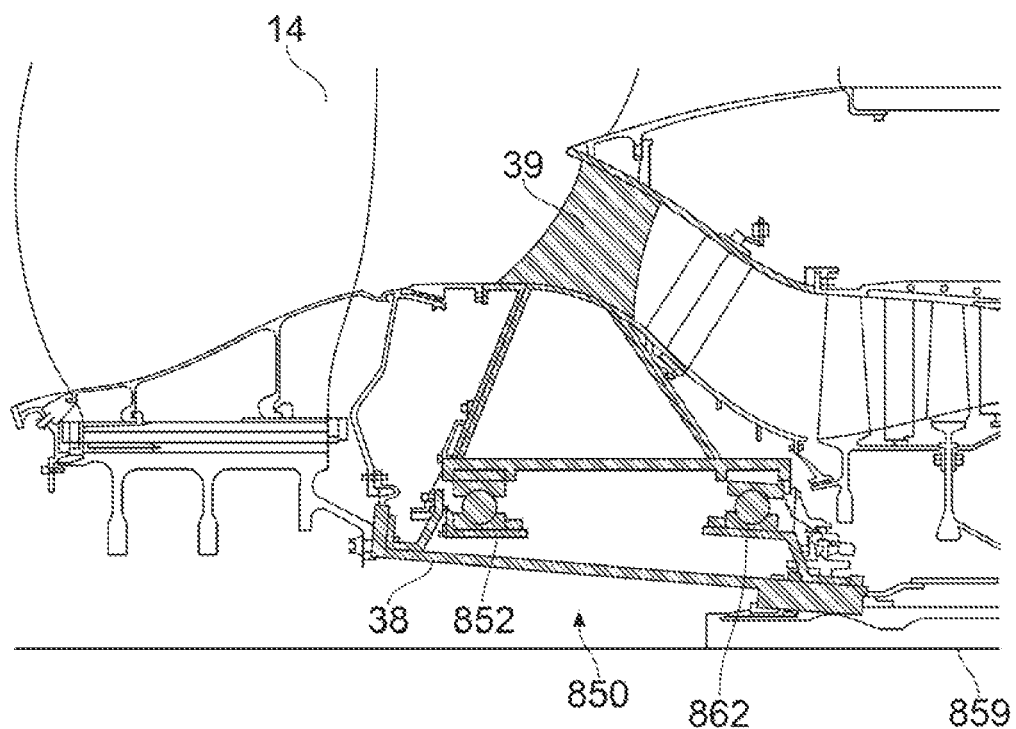

FIGS. 11a and 11b show an ninth bearing assembly 850 installed in a gas turbine engine 10 in a balanced condition and in an out of balance condition respectively.

The assembly 850 comprises a low pressure (fan) shaft 38 rotatably coupled by first and second bearings 852, 862 to an outlet guide vane 39 via radially extending support arms 880, 882. The assembly 850 comprises a superelastic titanium element 858, 865 located between each respective bearing 852, 862 and the respective support arms 880, 882. The bearings 852, 862 are axially spaced, and each define a load path 857, 867 extending from the fan shaft 38 to the outlet guide vane 39 via the respective bearings 852, 862 and superelastic elements 858, 868 and support arms 880, 882.

The assembly further comprises a frangible connection 884 between the first bearing 852 and the fan shaft 38.

During normal operation, as shown in FIG. 11a when in a balanced condition, the assembly 850 acts in a similar manner to that of the seventh bearing assembly 650, with the superelastic titanium elements 858, 868 balancing the load between the first and second bearings 852, 862 due to the different compressive loads experienced by each superelastic titanium element 858, 868 when the load is unbalanced. Furthermore, due to the superelastic of the elements 858, 868, the elements provide damping thereby reducing radial vibration of the shaft 38.

When the fan shaft 38 becomes out of balance, such as after a blade off event, a radial force is imparted to the bearings 852, 862. The radial force imposed on the first bearing 852 breaks the frangible connection 884, such that the shaft 38 is supported only by the second bearing 662. A pivoting force is imposed on the second bearing 662, which causes the shaft 38 to rotate off centre, such that the superelastic titanium element 868 flexes as the fan shaft 38 rotates. Due to the relatively low modulus of the superelastic element 868, the element 868 is capable of significant flexing, while also providing damping, which reduces vibration as the fan 14 slows to windmilling speed. Consequently, the bearing arrangement 850 does not require separate catcher bearings or universal joints, since the main bearing arrangement 850 is capable of accommodating the required loads.

The invention thereby provides an arrangement in which loads are shared equally between two or more bearings in a bearing assembly, while permitting larger manufacturing tolerances compared to some prior arrangements, and while being less, complex and more robust than other prior arrangements. In some arrangements, the arrangement is also more robust in a failure condition.

The increased strain in the bearings provided by the superelastic element also provides greater movement when the shaft is put under load. This makes measurement of load using strain gauges or proximity sensing more sensitive, thereby resulting in greater load sensing accuracy.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the bearing assembly could comprise more than two bearings, wherein at least one of the bearings comprises a superelastic element located within the load path of the respective bearing. Where the bearing assembly comprises more than two bearings, the load is shared equally between all of the bearings. The superelastic titanium element could comprise any titanium alloy having a modulus less than 80 GPa. The coupled bearings and support elements could be arranged in different ways, provided a superelastic titanium element is located in a load path of at least one of the bearings.

The invention claimed is:

1. A bearing arrangement comprising:
   a first bearing including a first support element and a first set of rolling elements, wherein a first load path extends through the first support element and the first set of rolling elements;
   a second bearing including a second support element and a second set of rolling elements, wherein a second load path extends through the second support element and the second set of rolling elements;
   a coupling between the first support element and the second support element arranged to transmit a load applied to either the first support element or the second support element through both the first and second load paths; and
   a superelastic titanium alloy element located in the first load path and the second load path.

2. The bearing arrangement according to claim 1, wherein the first and second support elements are spaced apart in an axial direction.

3. The bearing arrangement according to claim 2, wherein:
   the first support element is coupled to a first side of the first set of rolling elements, and coupled to a first side of the second set of rolling elements; and
   the second support element is coupled to a second side of the first set of rolling elements, and coupled to a second side of the second set of rolling elements.

4. The bearing arrangement according to claim 1, further comprising:
   a first superelastic titanium element located between the first set of rolling elements and the first support element; and
   a second superelastic titanium element located in the second load path between the second set of rolling elements and the second support element.

5. The bearing arrangement according to claim 1, further comprising a superelastic titanium element extending between the first load path and the second load path.

6. The bearing arrangement according to claim 1, wherein the superelastic titanium alloy element includes parameters corresponding to a required strain.

7. The bearing arrangement according to claim 6, wherein the parameters of the superelastic titanium alloy element comprise at least one of: a material thickness of the superelastic titanium alloy element in a direction extending along the load path, a contact area between at least one of the first bearing and the second bearing and the superelastic titanium alloy element, and at least one material property of the superelastic titanium alloy element.

8. The bearing arrangement according to claim 1, wherein the superelastic titanium alloy element has an elastic modulus less than 80 GPa.

9. The bearing arrangement according to claim 8, wherein the superelastic titanium alloy element has an elastic modulus less than 60 GPa.

10. The bearing arrangement according to claim 1, further comprising a container at least partly surrounding the superelastic titanium alloy element, such that expansion of the superelastic titanium alloy element in a direction normal to a load direction of the load is constrained.

11. The bearing arrangement according to claim 1, wherein the superelastic titanium alloy element is attached to a support element along an attachment axis generally parallel to a load axis of the load, such that relative movement between the first support element and the second support element imparts a shear force to the superelastic titanium alloy element.

12. The bearing arrangement according to claim 1, wherein the superelastic titanium alloy element extends in a direction normal to a load direction, such that the load applied in the load direction to at least one of the first bearing and the second bearing applies a shear force to the superelastic titanium alloy element.

13. The bearing arrangement according to claim 1, further comprising a coolant passage configured such that coolant in the coolant passage is in thermal contact with at least one of the first bearing and the second bearing, and the superelastic titanium alloy element.

14. A gas turbine engine comprising the bearing arrangement according to claim 1.

15. The gas turbine engine according to claim 14, wherein the bearing arrangement is arranged to rotatably support a fan shaft of the gas turbine engine.

16. The gas turbine engine according to claim 15, wherein the first bearing is coupled to the fan shaft by a frangible coupling, the first bearing being arranged such that the first bearing is decoupled from the fan shaft when the fan shaft is subjected to a predetermined radial load.

* * * * *